W. C. SMITH.
TRUCK.
APPLICATION FILED FEB. 25, 1910.
1,006,985.
Patented Oct. 24, 1911.
2 SHEETS—SHEET 1.
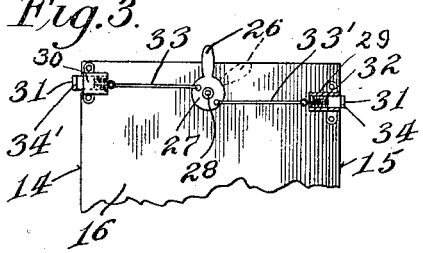
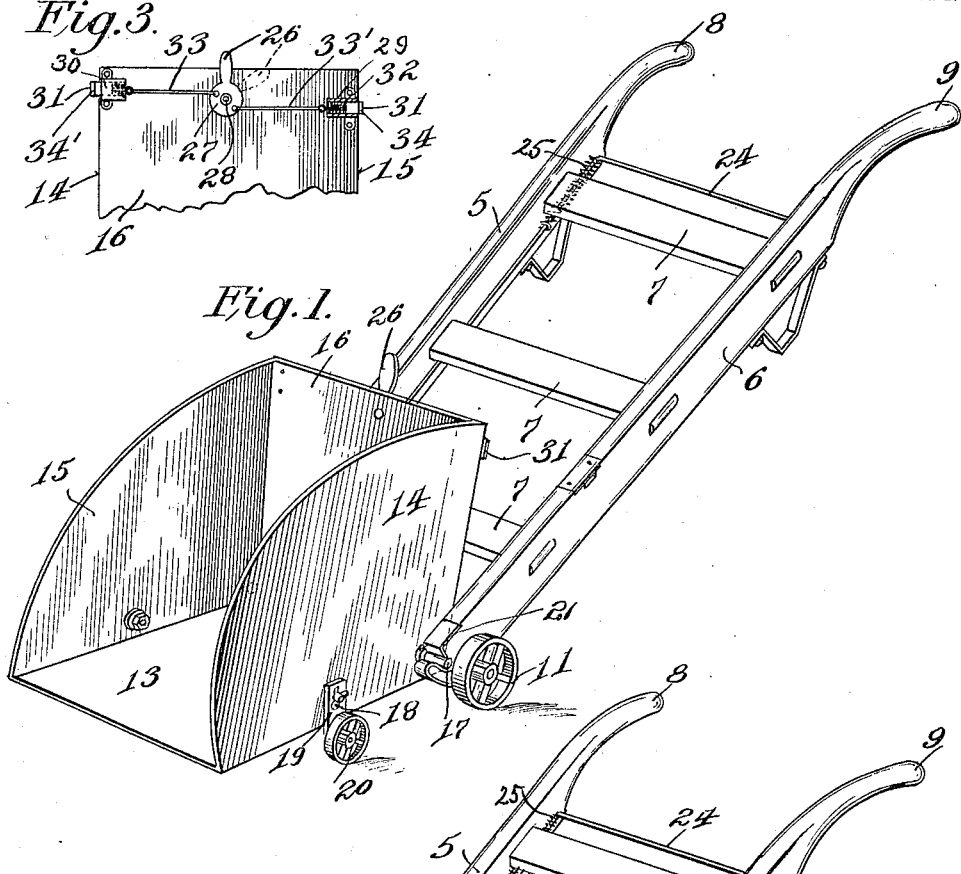
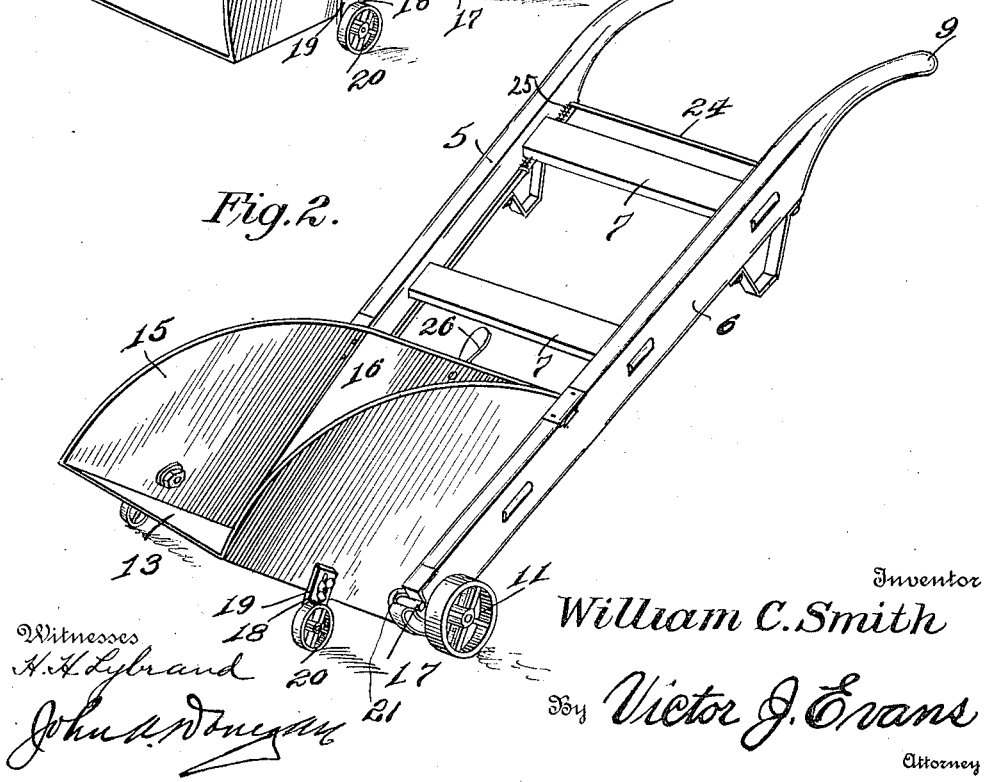
Witnesses
H. H. Lybrand
John A. Donaghy
Inventor
William C. Smith
By Victor J. Evans
Attorney
COLUMBIA PLANOGRAPH CO., WASHINGTON, D. C.

W. C. SMITH.
TRUCK.
APPLICATION FILED FEB. 25, 1910.

1,006,985.

Patented Oct. 24, 1911.
2 SHEETS—SHEET 2.

Witnesses
H. H. Lybrand
John Andregang

Inventor
William C. Smith
By Victor J. Evans
Attorney

UNITED STATES PATENT OFFICE.

WILLIAM CLAXTON SMITH, OF CHARLEROI, PENNSYLVANIA.

TRUCK.

1,006,985. Specification of Letters Patent. Patented Oct. 24, 1911.

Application filed February 25, 1910. Serial No. 545,970.

*To all whom it may concern:*

Be it known that I, WILLIAM C. SMITH, a citizen of the United States, residing at Charleroi, in the county of Washington and State of Pennsylvania, have invented new and useful Improvements in Trucks, of which the following is a specification.

The invention relates to trucks, and more particularly to the class of hand trucks.

The primary object of the invention is the provision of a hand truck, in which a scooping element may be removably connected thereto for conveniently handling or transferring all kinds of grain, potatoes, hard coal, sand, gravel, lime, or other loose material from one locality to another, and that is especially useful in loading and unloading cars, boats, or the like.

Another object of the invention is the provision of a hand truck, in which the scoop element may be locked upon the truck in raised position for retaining its contents during the travel of the truck, the scoop element being capable of dropping to dumping position, or for loading purposes when unlocked.

A further object of the invention is the provision of a hand truck which is simple of construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 4:
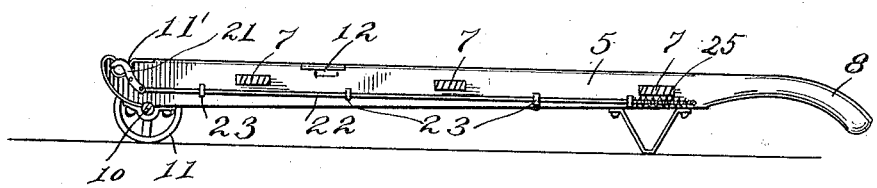
Figure 5:
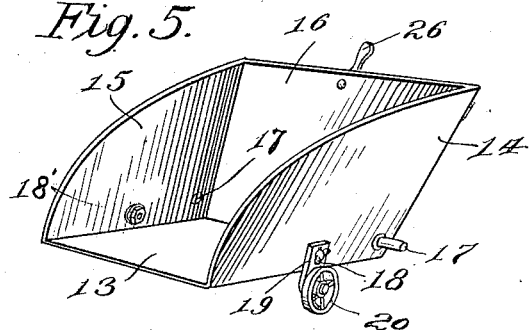
Figure 6:
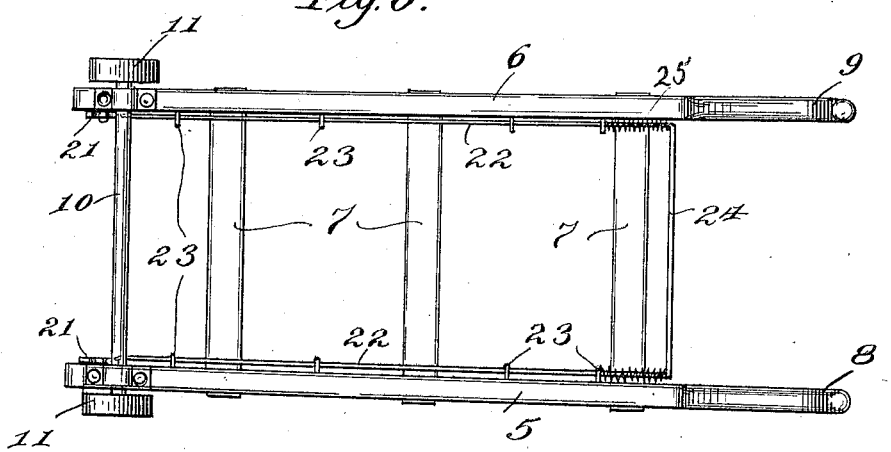

In the drawings: Figure 1 is a perspective view of a truck, showing the scoop in one position thereon. Fig. 2 is a similar view, showing the scoop element in another position thereon. Fig. 3 is a detail end view of the upper portion of the scoop. Fig. 4 is a longitudinal sectional view of the truck. Fig. 5 is a perspective view of the scoop. Fig. 6 is a bottom plan view of the truck.

Similar reference characters indicate corresponding parts throughout the several views of the drawings.

Referring to the drawings by numerals, the truck comprises a frame structure, including spaced parallel side bars 5 and 6, the same being connected by means of intermediate and outer cross pieces or rungs 7 in the ordinary well-known manner. The side bars terminate at one end of the frame in handles 8 and 9, and carry near their opposite ends suitable bearings, in which is journaled an axle 10, on opposite ends of which are fixed the usual supporting wheels 11, whereby the truck may travel from one point to another. The upper sides of the side bars 5 and 6, opposite the bearings supporting the axle 10, are provided with notches 11', serving as bearing sockets, for a purpose as will be hereinafter more fully described.

Detachably supported by the truck frame is a swinging scoop element, comprising a bottom 13, side walls 14 and 15, and a rear wall 16, which rises from the bottom at right angles thereto. Formed on the side walls 14 and 15 near their juncture with the bottom 13 and rear wall 16, are laterally projecting trunnions 17, the same being adapted for detachable engagement in the notches 11' in the side bars 5 and 6 of the truck frame. Thus, it will be seen that when the trunnions 17 are engaged in the notches of the side bars 5 and 6, the scoop element may swing in an arc toward and away from the truck frame in the loading and unloading thereof.

Mounted in the side walls 14 and 15 of the scoop element, at points forwardly of the trunnions 17, are bolt members 18', the same being engaged by adjustable hangers 19, which are held in adjusted position by means of winged nuts 18 threaded on the said bolt members. Formed at the lower ends of the hangers 19 are laterally extending stud axles, on which are rotatably mounted caster wheels 20, so that when the scoop element has been swung outwardly from the truck frame, the wheels 20 will be in a position for contacting with the ground, thereby preventing the bottom 13 of the scoop element from scraping the ground, as the truck is advanced for the loading thereof.

Pivotally mounted upon the under faces of the side bars 5 and 6 of the frame, at points contiguous to the bearing sockets or notches 11', are hook-like latches 21, the same being adapted for locking engagement with the trunnions 17 of the scoop element when the same is mounted on or carried by the truck. Loosely connected with the latches 21 is a U-shaped bail 22, the side arms or limbs of which are slidably fitted in suitable guide eyes 23 fixed in the side bars 5 and 6 at the inner faces thereof. The cross connecting portion between the side arms or limbs of the bail is adapted to form a handle 24, the latter extending transversely of the truck frame at a slight distance forwardly of the handles 8 and 9 thereof. Thus it will be seen that on pushing upon the handle 24 of the bail, the latches 21 may be retracted for their disengagement with the trunnions 17, whereby the latter may be detached from the notches 11' in the side bars 5 and 6 of the truck frame for the removal of the scoop therefrom.

Surrounding the side arms or limbs 22 of the bail are coiled expansion springs 25, each having one end working against the handle portion 24 of said bail, while its opposite end works against an adjacent guide eye 23, the springs being designed to exert a pull upon the bail, and thereby hold the latches 21 in normal locking position for engagement with the trunnions 17 of the scoop element. The scoop element, when moved inwardly toward the truck frame, will rest upon the adjacent cross piece 7 thereof, and mounted upon the rear wall 16 of the said scoop element is a locking device, comprising a lever 26 having a circular disk-like extremity 27 provided with a central opening for receiving a pivot pin 28, fixed in the said rear wall 16 of the scoop element. Secured at opposite sides of the lever to the rear wall of the scoop element are latch casings 29 and 30, the casing 30 being disposed out of alinement with the casing 29. Slidably fitted within the casings 29 and 30 are locking bolts 31, the same being acted upon by coiled expansion springs 32 which serve to project the bolts beyond the side walls 14 and 15 of the scoop element, whereby said bolts will engage with suitable keeper plates 12 fixed to the side bars 5 and 6 of the truck frame.

Loosely connected with the disk terminal 27 of the lever 26, at opposite sides of its pivot 28, are links 33 and 33', the same being loosely engaged with the bolts 31, so that on the shifting of the disk terminal 27 of the lever 26 in one direction, the bolts 31 may be retracted within the casings, thereby unlocking the scoop element, whereby it may swing to dumping position.

The outer ends of the bolts 31 are provided with beveled surfaces 34 and 34', the same being adapted to contact with the keeper plates 12 when the scoop element has been swung inwardly toward the truck frame, so that the bolts will automatically retract within the casings, thereby tripping over the keeper plates 12 for locking engagement therewith.

From the foregoing, taken in connection with the accompanying drawings, the construction and operation of the invention will be readily understood without requiring a more extended explanation, and therefore the same has been omitted.

Having thus described the invention, what is claimed is:

1. The combination with a wheeled scoop having laterally projecting trunnions, of a truck comprising a frame provided with alining sockets at one end for receiving said trunnions of the scoop and handles at the opposite end of the frame, an axle journaled near the socketed end of the truck frame and having wheels, latches pivoted to the frame and normally locking said trunnions in the sockets, and a bail slidably mounted on the frame and connected with the latches, whereby the same may be disengaged from the trunnions of the scoop.

2. The combination with a wheeled scoop having laterally projecting trunnions, of a truck comprising a frame provided with alining sockets at one end for receiving said trunnions of the scoop and handles at the opposite end of the frame, an axle journaled near the socketed end of the truck frame and having wheels, latches pivoted to the frame and normally locking said trunnions in the sockets, a bail slidably mounted on the frame and connected with the latches, whereby the same may be disengaged from the trunnions of the scoop, and locking means mounted on the scoop and engageable with the frame for holding said scoop in raised position.

In testimony whereof I affix my signature in presence of two witnesses.

WILLIAM CLAXTON SMITH.

Witnesses:
 F. P. McClarky,
 Minnie B. Richardson.

Copies of this patent may be obtained for five cents each, by addressing the "Commissioner of Patents, Washington, D. C."